United States Patent [19]

Cugasi, Jr.

[11] 4,304,815
[45] Dec. 8, 1981

[54] AQUEOUS RELEASE COATING COMPOSITIONS AND SUBSTRATES COATED THEREWITH

[75] Inventor: Peter J. Cugasi, Jr., Hamilton Square, N.J.

[73] Assignee: Congoleum Corporation, Kearny, N.J.

[21] Appl. No.: 122,917

[22] Filed: Feb. 20, 1980

Related U.S. Application Data

[62] Division of Ser. No. 886,238, Mar. 13, 1978, abandoned.

[51] Int. Cl.³ .............................................. B32B 9/04
[52] U.S. Cl. .................................. 428/280; 428/283; 428/331; 428/352; 428/443; 428/451; 428/454; 428/520; 428/522; 428/537
[58] Field of Search ................. 428/40, 280, 282, 352, 428/355, 443, 451, 454, 520, 522, 283, 331, 537; 260/29.6 WA

[56] References Cited

U.S. PATENT DOCUMENTS

| | | | |
|---|---|---|---|
| 3,084,133 | 4/1963 | Sirota | 260/29.6 |
| 3,281,267 | 10/1966 | Rice | 428/537 |
| 3,634,349 | 1/1972 | Goi | 260/29.6 |
| 3,664,912 | 5/1972 | Olson | 428/537 |
| 3,714,086 | 1/1973 | Schaefer | 260/29.6 |
| 3,931,088 | 1/1976 | Sakurada | 260/29.6 |

Primary Examiner—Marion McCamish
Attorney, Agent, or Firm—Richard T. Laughlin

[57] ABSTRACT

Aqueous release coating compositions for application to substrates having low absorption thereinto, excellent adhesion thereto, and easy and quick release and removal therefrom comprising:
  from about 3% to about 8% of polyvinyl alcohol;
  from about 9% to about 35% clay;
  from about 5% to about 12% of an adhesive binder; and
  from about 49% to about 75% of water.

All percentages being by weight, based on the total weight of the aqueous release coating composition.

The resulting release-coated substrates are also included in the inventive concept.

7 Claims, No Drawings

AQUEOUS RELEASE COATING COMPOSITIONS AND SUBSTRATES COATED THEREWITH

This patent application is a division of patent application, Ser. No. 886,238, filed on Mar. 13, 1978 which is now abandoned.

BACKGROUND OF THE INVENTION

Aqueous release coating compositions have been used for many years for application to various substrates, whereby various materials may be placed in adhering contact with such release-coated substrates but wherein such various materials may be easily and quickly released and removed from such release-coated substrates at a subsequent time.

Release coating compositions commonly in present commercial and industrial use contain conventional release agents, such as a silicone polymer, or a stearate chromium complex, or other relatively expensive materials, or other relatively less expensive release agents, such as polyvinyl alcohol.

However, even polyvinyl alcohol is relatively expensive, as compared to other commercial materials and, particularly in those applications where the polyvinyl alcohol is applied to a more or less porous substrate and is undesirably absorbed thereinto, it is desired that either the concentration of the polyvinyl alcohol in the release coating composition be reduced to an absolute minimum, or that measures be taken to reduce the undesirable absorption of the polyvinyl alcohol into the more or less porous substrate.

Of course, the substrate could be initially pre-treated with a primer coating or sealing compound, such as a thin layer of a relatively hard wax, or similar material, which would materially prevent the polyvinyl alcohol from undesirably soaking into the substrate, but such practice does not markedly reduce the materials-cost factor involved and actually in many instances increases the overall production-cost factor by the introduction of an additional processing step in the overall manufacturing cycle.

THE PURPOSES AND OBJECTS OF THE PRESENT INVENTION

It is therefore a principal purpose and object of the present invention to provide a polyvinyl alcohol release coating composition which can be economically applied to a more or less porous substrate in a single processing step wherein the polyvinyl alcohol release coating composition does not undesirably soak into the substrate to which it is applied but remains essentially as a coating on the surface of such substrate to more efficiently carry out its adhering and subsequent release functions.

BRIEF SUMMARY OF THE INVENTION

It has been found that such principal purpose and object, as well as other principal purposes and objects which will become clear from a further reading and understanding of this specification, may be accomplished by providing an aqueous release coating composition suitable for application to a more or less porous substrate and having low absorption thereinto, excellent adhesion thereto, and easy and quick release and removal therefrom comprising:

from about 3% to about 8% of polyvinyl alcohol;
from about 9% to about 35% of clay;
from about 5% to about 12% of an adhesive binder; and
from about 49% to about 75% of water,
all percentages being by weight, based on the total weight of the aqueous release coating composition.

The resulting release-coated substrates are also included in the inventive concept.

SPECIFIC DESCRIPTION OF THE INVENTION

In the following specification and accompanying working examples, there are described and illustrated preferred and typical compositions and embodiments of the invention in specific detail but such is not to be construed as limitative of the broader aspects of the invention but merely illustrative thereof.

THE SUBSTRATES

The particular substrate to which the aqueous release coating composition is applied does not relate to the essence of the invention. Illustrative, but not limitative, examples of such substrates are: felts of cellulosic, asbestos, or other natural, synthetic, or man-made fibers and/or filaments; paper products and paper, such as kraft paper, crepe paper, glassine, particle board, chip board, card board, paper board, pressed fiber board, etc.; natural or synthetic rubber or elastomers; fibrous webs, cloth, nonwoven fabrics, woven, knitted or otherwise fabricated materials; metal sheets, strips or foils; leather and leather-like products; plastic films, strips, and sheets; wood, plywood and wood veneer; and like materials, preferably in continuous sheet or strip form.

The aqueous release coating composition may be applied to the substrate by any desired coating process, including brush, roller, pad, knife, extrusion, dip, curtain, spray, or other coating process. More specific descriptions of such coating processes are to be found in the Encyclopedia of Polymer Science and Technology, Volume 3, pages 765 through 807, copyright 1965, John Wiley & Sons, Inc.

The thickness of the release coating may vary from as little as about 1 or 2 mils, or even less, up to about 3 to 10 mils, or even more, depending primarily upon the nature of the aqueous release coating composition, its properties and characteristics, and upon the intended subsequent use and purpose of the release-coated substrate. The aqueous release coating composition is preferably applied to the substrate in a single coating process. However, in certain circumstances wherein a thicker coating is required, then the aqueous release coating composition may be applied to the substrate in two or more coating steps.

THE POLYVINYL ALCOHOL

The polyvinyl alcohol which is included in the aqueous release coating composition may be substantially any commercially available polyvinyl alcohol. The so-called "super hydrolyzed" grades of polyvinyl alcohol having a % hydrolysis of about 99.7 or above are preferred. However, the "fully hydrolyzed" grades of polyvinyl alcohol having a % hydrolysis of from about 95.5 to about 98.8 are also of use within the scope of the present invention. The "partially hydrolyzed" grades of polyvinyl alcohol are similarly utilizable within the broader scope of the present invention. Such latter grades have a % hydrolysis of as low as about 88.7, or even 85.5. The viscosity in centipoises of a 4% aqueous solution at 20° C. of such utilizable grades of polyvinyl alcohol is in the range of from about 4 to about 50, with the molecular weights (approximate weight average) in the range of from about 10,000 to about 125,000.

The amount of polyvinyl alcohol which is included in the aqueous release coating composition will vary relatively widely, depending upon the circumstances and conditions of application to the substrate and the intended later use of the resulting release-coated substrate. From about 3% to about 8% by weight has been found to be commercially utilizable, with preferred ranges of from about 4% to about 6% by weight, based on the total weight of the aqueous release coating composition.

THE CLAY

The particular clay which is included in the aqueous release coating composition does not relate to the essence of the present invention. As used herein, the term clay is intended as a general term for a great variety of variously colored natural mixtures of silica and alumina, as well as occasional amounts of oxides of magnesium, calcium, and potassium, and many other constituents as impurities.

Clays are available commercially in a large variety of particle sizes or particle size ranges and, for the purposes of the present invention the usable range is a particle size range of from about ¼ micron to about 4 microns, with a preferred range of from about ½ micron to about 2 microns.

The amount of clay which is included in the aqueous release coating composition will vary relatively widely, depending upon the conditions of application to the substrate and the intended later use of the release-coated substrates. From about 9% to about 35% by weight has been found commercially utilizable, with preferred ranges of from about 12% to about 30% by weight, based on the total weight of the aqueous release coating composition.

THE ADHESIVE BINDER

The particular adhesive binder which is included in the aqueous release coating composition does not relate to the essence of the present inventive concept and may be substantially any commercially available synthetic, thermoplastic homopolymer or copolymer or terpolymer possessing the necessary adhesive properties, the chemical stability, the capability of being suspended or dispersed in aqueous media, the compatibility or misibility with the other constituents of the aqueous release coating composition, the particle size range, and so forth.

Typical illustrative but not limitative examples of such adhesive binders are: polyvinyl acetate homopolymers and copolymers; polyvinyl chloride-polyvinyl acetate copolymers; polyvinyl acetate-acrylic copolymers; etc.

The amount of adhesive binder which is included in the aqueous release coating composition will vary relatively widely, depending upon the circumstances of application of the aqueous release coating composition to the substrate and the intended subsequent use of the release coated substrate. From about 5% to about 12% by weight has been found commercially utilizible, with preferred ranges of from about 6% to about 9% by weight, based on the total weight of the aqueous release coating composition.

A particle size range of from about 1 micron to about 20 microns has been found commercially utilizable, wth preferred particle size ranges of from about 2 microns to about 15 microns.

OTHER CONSTITUENTS

Many other constituents may be included in the aqueous release coating compositions to modify or to enhance the properties and characteristic thereof to better suit the circumstances and the conditions of the application of the aqueous release coating composition to the various substrates, or the intended subsequent conditions of use of the release-coated substrates.

Such other constituents include: anti-foaming agents; surfactants and especially wetting agents, dispersants and emulsifiers; tackifiers; binders; suspending or dispersing agents; viscosity modifiers; fillers and extenders; plasticizers; stabilizers; antioxidants; UV-absorbers; etc.

Such other constituents may be included in the aqueous release coating compositions in lesser amounts of from about 0.1% by weight, or even less, up to 1 or 2% by weight, or even more, based on the weight of the total aqueous release coating composition.

WATER

The amount of water required to dissolve, disperse and/or suspend the various constituents of the aqueous release coating composition varies relatively widely, depending upon the nature and the concentration of such constituents and has been found to range from about 49% by weight to about 75% by weight, with preferred ranges of from about 52% by weight to about 63% by weight, based on the total weight of the aqueous release coating composition.

The present invention will be further illustrated and described with particular reference to the following specific working Examples wherein there are disclosed typical and preferred compositions and embodiments of the present inventive concept. However, it is to be stated that such specific Examples are primarily illustrative of the present invention and are not to be construed as limitative of the broader aspects thereof, except as defined and limited by the claims appended hereto.

EXAMPLE I

An aqueous release coating composition is prepared from the following constituents:

|  | Parts by weight |
|---|---|
| Water | 550 |
| Colloid 681-F anti-foaming agent | 3 |
| Tergitol 15-S-9 polyethylene glycol ether emulsifier | 4 |
| Vinol 125 polyvinyl alcohol 99.7+ % hydrolysis viscosity 28-32 | 50 |
| CWF clay (less than 2 microns) | 250 |
| Duroset H-100 polyvinyl acetate homopolymer adhesive binder particle size 2-10 microns | 70 |
| Ethylene glycol | 4 |

The aqueous release coating composition has a viscosity of 900–1000 centipoises at 72° F. and a weight per gallon of 9.9 pounds per gallon.

The aqueous release coating composition is applied by an air knife coater to the surface of a WS-80 asbestos fiber felt having a thickness of about 35 mils. The aqueous release coating composition is essentially only on the surface of the asbestos fiber felt substrate, has a total coating thickness of about 9 mils and has very little absorption into the substrate.

The release-coated substrate is used as a carrier for a layer of polyvinyl chloride flooring material having a thickness of about 80 mils. The polyvinyl chloride flooring material has excellent adhesion to the release-coated substrate and is carried thereby through the flooring manufacturing cycle. At the conclusion of the manufacturing cycle, the resilient polyvinyl chloride flooring material is easily and quickly released and removed from the release coated substrate.

EXAMPLE II

The procedures of Example I are followed substantially as described therein with the following exceptions and changes. The aqueous release coating composition has the following formulation:

| | Parts by weight |
|---|---|
| Water | 500 |
| Colloid 681-F anti-foaming agent | 2.5 |
| Vinol 125 polyvinyl alcohol | 39.5 |
| Tergitol 15-S-9 polyethylene glycol ether emulsifier | 3.7 |
| Ethylene glycol | 2.5 |
| CWF clay (less than 2 microns) | 250 |
| Duroset H-100 polyvinyl acetate homopolymer adhesive binder particle size 2–10 microns | 69 |
| Rhoplex E-32 self-cross-linking acrylic emulsion tackifier 46% solids | 3.5 |

The aqueous release coating composition is applied to a coating thickness of about 9 mils to a kraft paper substrate and is used as a carrier sheet for the processing of a polyvinyl chloride flooring material having a thickness of about 0.250 inch.

The properties and characteristics of the release-coated substrate are substantially as described in Example I and the results are generally comparable thereto.

EXAMPLE III

The procedures of Example II are followed substantially as described therein with the following exceptions and changes. The aqueous release coating composition has the following formulation:

| | Parts by weight |
|---|---|
| Water | 800 |
| Colloid 681-B anti-foaming agent | 4 |
| Vinol 125 polyvinyl alcohol | 63 |
| Tergitol 15-S-9 polyethylene glycol ether emulsifier | 6 |
| Ethylene glycol | 4 |
| CWF clay (less than 2 microns) | 400 |
| Duroset H-100 polyvinyl acetate homopolymer | 110 |
| Rhoplex E-32 self-cross-linking tackifier acrylic emulsion 46% solids | 8 |

The aqueous release coating composition has a viscosity of 850 centipoises at 72° F. and a weight per gallon of 10.1 pounds per gallon.

The properties and the characteristics of the release-coated substrate are substantially as described in Example II and the results are generally comparable thereto.

EXAMPLES IV AND V

The procedures set forth in Example III are followed substantially as described therein with the sole exception and change being the increase in the amount of self-cross-linking tackifier to 10 parts by weight in the formulation (Example IV) and the decrease in the amount of self-cross-linking tackifier to 5 parts by weight in the formulation (Example V).

The results of these Examples IV and V are commercially satisfactory and are generally comparable to the results of Example III, except that it is noted that the larger the amount of tackifier which is used in the formulation, the more adhesive is the grip of the release-coated substrate on the polyvinyl chloride flooring material. Additionally, the release and removal of the polyvinyl chloride resilient flooring material from the release-coated substrate at the conclusion of the manufacturing cycle is a little tighter. The results are nevertheless commercially acceptable. Increase of the amount of self-cross-linking tackifier to 16 parts by weight in the formulation, however, creates a too-tight situation and is considered undesirable and unsatisfactory commercially.

EXAMPLE VI

The procedures set forth in Example I are followed substantially as described therein with the sole exception and change being that the Vinol 125 polyvinyl alcohol is replaced by an equivalent amount of Gelvatol 1-30 which is a "fully hydrolyzed" polyvinyl alcohol having a % hydrolysis of 98.5 and a molecular weight (approximate weight average) of 14,000 and a viscosity of 6 centipoises (4% aqueous solution at 20° C.).

The results are generally comparable to the results obtained in Example I and the aqueous release coating composition is considered commercially acceptable.

EXAMPLE VII

The procedures set forth in Example I are followed substantially as described therein with the exception that the Vinol 125 polyvinyl alcohol is replaced by an equivalent amount of Vinol 325, a fully-hydrolyzed polyvinyl alcohol 98% hydrolyzed with a viscosity of about 32 centipoises (4% aqueous solution at 20° C.).

The results of this Example are generally comparable to the results obtained in Example I. The release composition-coated substrate is well capable of having other materials applied and adhered thereto, acting as a carrier for such other materials, and then subsequently being capable of easily and quickly releasing and removing such other materials. The release composition-coated substrate is commercially acceptable.

EXAMPLE VIII

The procedures set forth in Example I are followed substantially as described therein with the exception that the Vinol 125 polyvinyl alcohol is replaced by an equivalent amount of 88.7% hydrolyxed Gelvit 20–60 BP polyvinyl alcohol, having a molecular weight (approx. wt. average) of 96,000 and a viscosity of 21–25 centipoises for a 4% aqueous solution at 20° C.

The results of this Example are generally comparable to the results Example I. The release composition-coated substrate is well capable of having other materials applied and adhered thereto, of acting as carrier for such other materials when passed through a manufacturing cycle, and subsequently of having such other materials released and removed easily and quickly therefrom. Commercial acceptance is noted.

EXAMPLE IX

The procedures set forth in Example I are followed substantially as described therein with the exception that the Vinol 125 polyvinyl alcohol is replaced by an equivalent amount of 98-98.8% hydrolyzed polyvinyl alcohol having a viscosity of 5-7 centipoises for a 4% aqueous solution at 20° C.

The results of this Example are generally comparable to the results of Example I. The release composition-coated substrate is well capable of having other materials applied and adhered thereto, of acting as a carrier for such other materials when passed through a manufacturing process, and subsequently of having such other materials released and removed easily and quickly therefrom. Commercial acceptance is noted.

EXAMPLE X

The procedures set forth in Example I are followed substantially as described therein with the exception that the CWF clay is replaced by an equivalent amount of Huber clay No. 35 having a particle size range less than 2 microns.

The results of this Example are generally comparable to the results obtained in Example I. The release composition-coated substrate is well capable of having other materials applied and adhered thereto, of acting as a carrier for such other materials through a manufacturing process, and subsequently of having such other materials released and removed easily and quickly therefrom. Commercial acceptance is noted.

EXAMPLE XI

The procedures set forth in Example I are followed substantially as described therein with the exception that the polyvinyl acetate homopolymer adhesive binder is replaced by an equivalent amount of a polyvinyl chloride-polyvinyl acetate copolymer adhesive binder.

The results of this Example are generally comparable to the results obtained in Example I. The release composition-coated substrate is well capable of having other materials applied and adhered thereto, of acting as a carrier for such other materials when passed through a manufacturing process, and subsequently of having such other materials easily and quickly released abd removed therefrom. Commercial acceptance is noted.

Although numerous specific examples of the present inventive concept have been described, it is to be realized that the broader aspects of such present inventive concept are not to be construed as limited thereto, nor to the specific materials and formulations disclosed therein, but to include various other materials and formulations and other features, as set forth within the scope of the appended claims. It is to be understood that any suitable changes, modifications, and variations may be made without departing from the spirit and the scope of the invention.

What is claimed is:

1. A release composition-coated material capable of having other materials applied and adhered thereto and of having said other materials subsequently easily and quickly released and removed therefrom comprising: a substrate in sheet material form: and a release coating composition on said substrate comprising from about 3 parts to about 8 parts of polyvinyl alcohol: from about 9 parts to about 35 parts of clay: having a particle size of from 0.25 to about 4 microns and from about 5 parts to about 12 parts of an adhesive binder, all parts being by weight: and a layer of polyvinyl chloride sheet material adhered to said substrate by said release coating composition but being subsequently easily and quickly released and removed therefrom.

2. A release composition-coated material as defined in claim 1, wherein said substrate is an asbestos fiber felt.

3. A release composition-coated material as defined in claim 1, wherein said substrate is kraft paper.

4. A release composition-coated material as defined in claim 1, wherein said polyvinyl alcohol has a percent hydrolysis of at least about 85.5%.

5. A release composition-coated material as defined in claim 1, wherein said adhesive binder is a polyvinyl acetate homopolymer.

6. A release composition-coated material as defined in claim 1, wherein said adhesive binder is a polyvinyl chloride-polyvinyl acetate copolymer.

7. A release composition-coated material as defined in claim 1, wherein said release coating composition also comprises from about 0.19% to about 0.26% by weight of a self-reactive self-cross-linking acrylic polymer.

* * * * *